United States Patent [19]

Plank et al.

[11] 4,191,638
[45] Mar. 4, 1980

[54] REFORMING CATALYSTS

[75] Inventors: Charles J. Plank, Woodbury; Edward J. Rosinski, Pedricktown, both of N.J.; Edwin N. Givens, Bethlehem, Pa.

[73] Assignee: Mobil Oil Corporation, New York, N.Y.

[21] Appl. No.: 953,671

[22] Filed: Oct. 23, 1978

Related U.S. Application Data

[60] Division of Ser. No. 757,113, Jan. 5, 1977, Pat. No. 4,141,859, which is a continuation-in-part of Ser. No. 503,131, Sep. 4, 1974, abandoned, which is a continuation-in-part of Ser. No. 262,410, Jun. 13, 1972, abandoned.

[51] Int. Cl.$^2$ .............................................. C10G 35/08
[52] U.S. Cl. ................................... 208/139; 252/441; 252/455 Z
[58] Field of Search ................... 208/139; 252/455 Z, 252/441

[56] References Cited

U.S. PATENT DOCUMENTS

| | | | |
|---|---|---|---|
| 3,544,451 | 12/1970 | Mitsche et al. | 208/139 |
| 3,617,520 | 11/1971 | Klaksdahl | 208/138 |
| 3,684,692 | 8/1972 | Keith et al. | 208/139 |
| 3,700,585 | 10/1972 | Chen et al. | 208/111 |
| 3,702,886 | 11/1972 | Argsuer et al. | 423/328 |
| 3,709,979 | 1/1973 | Chu | 423/328 |
| 4,016,245 | 4/1977 | Plank et al. | 423/328 |

*Primary Examiner*—C. Davis
*Attorney, Agent, or Firm*—Charles A. Huggett; Raymond W. Barclay; Claude E. Setliff

[57] ABSTRACT

Crystalline aluminosilicate zeolites are mixed with conventional reforming catalysts to produce new catalytic compositions with high catalytic activity and selectivity and excellent aging characteristics. These new catalytic compositions may be utilized alone or in conjunction with conventional reforming catalysts. The acidic activity of the total catalyst system is controlled within defined limits. When so controlled the utility of these catalyst systems in reforming hydrocarbon mixtures is to reduce the $C_1$ and $C_2$ concentrations in reformer gas product, while increasing the $C_3$ and $C_4$ concentrations and maintaining high liquid yield at high octane numbers.

19 Claims, No Drawings

REFORMING CATALYSTS

CROSS REFERENCE TO RELATED APPLICATIONS

This application is a division of U.S. application Ser. No. 757,113, filed Jan. 5, 1977, now Pat. No. 4,141,859 which is a continuation-in-part of U.S. application Ser. No. 503,131, filed Sept. 4, 1974, and now abandoned, which in turn is a continuation-in-part of U.S. application Ser. No. 262,410, filed June 13, 1972, and now abandoned.

BACKGROUND OF THE INVENTION

1. Field of the Invention

This invention relates to novel catalytic compositions and their use as reforming catalysts. More specifically, these catalysts comprise the joint use of zeolites with conventional reforming catalysts such as platinum or platinum-rhenium or multi-metallics on alumina.

2. Description of the Prior Art

Catalytic reforming of naphtha feed stocks has long been known in the petroleum industry. Most naphtha feeds contain large amounts of naphthenes and paraffins and consequently have low octane numbers. By means of various hydrocarbon conversion reactions, catalytic reforming has improved the octane number of naphtha feed stocks. Some of the more important conversion reactions that take place during catalytic reforming are dehydrogenation of naphthenes to aromatics, dehydrocyclization of paraffins to naphthenes and aromatics and isomerization of normal paraffins to isoparaffins. A less desirable reaction that also occurs during reforming is the hydrocracking of long chain paraffins to gaseous hydrocarbons such as methane and ethane.

The above reforming reactions have previously been catalyzed by catalysts comprising porous supports, such as alumina, that have dehydrogenation promoting metal components impregnated or admixed with the support. Platinum on alumina and, more recently, multimetallics, including bimetallics, such as platinum and rhenium on alumina, are examples of these catalysts.

Reforming catalysts should possess high selectivity, high activity and good stability. Selectivity in reforming is the ability of a catalyst to selectively produce high yield of high octane products, such as aromatics, from compounds that have relatively low octane numbers, such as naphthenes and paraffins. The activity of a catalyst is the ability to convert the feed stock into all products without regard to selectivity. A stable catalyst is highly desirable so that the activity and selectivity characteristics of a catalyst can be maintained during prolonged periods of operation.

It is known in the art to admix certain zeolites with other catalytic materials. For instance, British Pat. No. 1,056,493 discloses mixing together an alumina-supported platinum catalyst and a chabazite zeolite and using it in a hydrocracking operation. British Pat. No. 1,255,544 discloses a dual purpose catalyst comprising a zeolite, especially mordenite, having incorporated therein both platinum and rhenium. However, these patents do not suggest the catalysts of this invention since they do not afford the same advantages. The octane number improvement and their remarkable ability to withstand aging with the catalysts of this invention are significantly greater than can be obtained with the catalysts of the British patents mentioned.

U.S. Pat. No. 3,267,022 and U.S. Pat. No. 3,324,047 disclose composites of a zeolite having a pore size of from 6–14Å and an adjuvant such as alumina. Hydrogenation activity is said to be imparted by adding, for example, a Group VIII metal, either to the zeolite or to the adjuvant. The amount of zeolite is from 20–80% by weight.

U.S. Pat. No. 3,544,451 refers to a hydrocarbon conversion catalyst which comprises platinum and rhenium combined with a carrier material containing alumina and finely divided mordenite. As will be shown hereinafter, combinations similar to those of the patent are ineffective for the purposes of the present invention.

U.S. Pat. No. 3,702,886 discloses a composite of from 1–90% of a zeolite, such as ZSM-5, with a matrix material and a hydrogenation component. The matrix materials include generally metal oxides, but not specifically alumina.

As another example of the state of the art, U.S. Pat. No. 3,758,402 discloses the hydrocracking of hydrocarbons to motor fuel products by contacting a hydrocarbon charge with a catalytic mixture containing hydrogenation components, a large pore size zeolite such as zeolite X or Y and a smaller pore size zeolite such as ZSM-5 and a matrix material, an example of which is alumina. The zeolite components may comprise from 1–95% of the final composite.

U.S. 3,365,392 discloses the catalytic reforming of gasoline charge stock to produce high octane reformate and LPG by contacting a charge with a catalyst comprising a platinum group metal on a support comprising a finely divided crystalline aluminosilicate suspended in an alumina matrix. The preferred aluminosilicate is the hydrogen or polyvalent form of mordenite, especially the hydrogen form thereof.

U.S. Pat. No. 3,546,102 is concerned with a hydrocarbon conversion catalyst consisting essentially of a cocatalytic support and a Group VIII metal. The support contains an adsorbent refractory inorganic oxide and mordenite structure zeolite. The preferred metal is platinum, and it is incorporated into the zeolite-inorganic oxide blend after blending but before drying and calcining.

Other U.S. patents disclosing catalytic composites comprising platinum, or rhenium, or both, optionally a matrix and mordenite as the sole or preferred cyrstalline aluminosilicate are U.S. Pat. Nos. 3,369,997, 3,376,214, 3,376,215, 3,464,929, 3,511,773, 3,523,914, 3,562,108 and 3,574,092.

All of the U.S. patents mentioned, can be distinguished on one or both of two different grounds. The first, already mentioned in connection with U.S. Pat. No. 3,544,451, is that it is conclusively shown herein that mordenite composites are inferior. The second is that no patent mentioned teaches or even suggests the extraordinary stability at high liquid yields at high octane numbers of the composites of this invention by controlling the activity so that its activity function will fall within the limits to be hereinafter defined.

SUMMARY OF THE INVENTION

Zeolites of controlled activity are mixed with reforming catalysts yielding a catalysts composite (sometimes called "composite A" or simply "catalyst A" hereinbelow) with improved selectivity and aging characteristics.

The catalysts of this invention have the ability, when compared to commercially available reforming catalysts, to reduce the $C_1$ and $C_2$ concentrations in the effluent gas while increasing the $C_3$ and $C_4$ yields. This necessarily improves the selectivity of the catalyst and increases the yield of high octane products. The catalyst is also more active and much more resistant to aging than conventional reforming catalyst and give higher octane number products at given conditions.

In essence, the invention concerns the reforming of hydrocarbons by contacting same under reforming conditions with a catalyst system in which the total catalyst comprises from about 1% to about 100% of a composite comprising (a) an effective amount, up to about 25%, by weight of a crystalline aluminosilicate zeolite of controlled acidity, (b) not less than about 75%, by weight, of a carrier material, (c) from about 0.01% to about 2%, by weight, of a platinum group metal either alone or in combination with other metals, and (d) from about 0.01 to about 3%, by weight, of a halide and (2) from 0% to 99% of a conventional reforming catalyst composition comprising (a) a carrier material, (b) from about 0.01% to about 2%, by weight, of a platinum group metal either alone or in combination with other metals, and (c) from about 0.01% to about 3%, by weight, or a halide, said total catalyst system having a K factor from about 1.5 to about 15, this factor being as defined in the specification in equations 2 and 3. (2) above will be hereinafter sometimes referred to as "catalysts B".

DESCRIPTION OF THE INVENTION

Typical conventional reforming catalysts that may be employed in the catalyst system of these inventions include the platinum group metal reforming catalyst, including the bi-metallic and multi-metallic catalysts. The descriptions of such conventional catalysts, to follow, also apply to the carrier materials, preferably alumina, which comprises the major proportion of the zeolite-containing composite. While these two materials, the conventional catalyst and the carrier material in the zeolite-containing composite, may be identical this is by no means a requirement of this invention.

The phrase "platinum group metal" includes, for example, platinum, palladium, osmium, iridium, ruthenium, or rhodium and mixtures thereof with each other or with other metals, such as metals of Group VII-B, including rhenium, deposited on a suitable support. Generally, the major portion of the conventional reforming catalyst will be alumina, which may comprise as much as about 99% by weight or more of these composites. Other components may be combined with the alumina carrier, such as oxides of silicon, magnesium, zirconium, thorium, vanadium, titanium, boron or mixtures thereof. The platinum-alumina combination, either with or without one or more of the above listed components such as silica, may also be promoted with small amounts of halogen such as chlorine and fluorine in amounts ranging from about 0.1% up to about 5% by weight. Generally, less than about 3% of halogen is employed with the standard platinum group composite. In a preferred embodiment, the carrier material is a relatively high surface area material, preferably an eta-alumina or gamma-alumina material or mixtures thereof having a surface area of at least about 100 square meters per gram. Preparation of the "platinum group" component may be accomplished by different procedures described in the prior art. In one procedure an alumina carrier material is impregnated with the acid or salt of one or more of the herein described "platinum type" hydrogenating components in amounts that will produce about 0.01% up to about 2% by weight of the metal, but generally not substantially more than about 0.6% by weight of platinum is employed.

It is to be understood that a naturally occurring or a synthetically prepared alumina with or without silica may be employed as a carrier material or support. Preferably, supports are high surface area material such as a base alumina as discussed above. Before use, the high surface area platinum-containing composites may be reduced in a hydrogen atmosphere and maintained preferably in a substantially moisture-free atmosphere before being put on stream.

It is to be understood that the term "platinum group metal" reforming catalyst designates materials which perform the well-known reforming reactions of hydroisomerization and aromatization under conditions creating a low (essentially equilibrium) concentration of olefins in the effluent product.

In preparation of the zeolite-containing component A, not less than about 75% of the above conventional "platinum group metal" catalyst is mixed with an effective amount, up to about 25%, preferably up to about 15% by wt. of zeolite. The more preferred concentration of zeolite is about 0.1 to about 5% or about 10% intimately mixed with the conventional platinum metal-alumina component under conditions such that the average particle size of the zeolite is not more than about 10 microns. These percentages are based on the combined weight of conventional reforming catalyst plus zeolite in the composite A. The exact amount of zeolite that is mixed with the platinum-metal on alumina component depends upon the K factor described hereinbelow and the pretreatment conditions both of which are directly concerned with the activity of the zeolite catalyst.

The activity and aging characteristics of reformer systems are remarkably controlled by catalyst composites of this invention which are prepared with regulated degrees of acidity. Because catalyst composites of this invention have higher acidities than conventional reforming catalysts, the acidity of the total reformer system that contains zeolite composites in either all or part of the total reformer, will be somewhat greater than for conventional systems. Thus we found that the acidity of the total reformer catalyst system (A plus B) when properly controlled gave a balanced activity and aging characteristics. This occurred when the K factor was not less than about 1.5 and not greater than about 15. The K factor for a total reformer system is defined as a function of the rate at which all catalysts in a system isomerizes o-xylene to m- and p-xylenes compared to that at which a standard reforming catalyst (minus any zeolite) isomerizes o-xylene under the same condition. Further the "Relative Activity" for a given composite is defined as the rate at which the composite isomerizes o-xylene to m- and p-xylenes compared to that at which the standard reforming catalyst minus any zeolite isomerizes o-xylene under the same conditions.

Isomerization activities of these composites were measured in an isothermal downflow tubular glass reactor at atmospheric pressure. The reactor bed of approximately 0.5 grams of 14×25 mesh pre-reduced particles was preceded by a preheat section containing 3 cc of 8/10 mesh quartz chips. The preheat and catalyst bed sections were both maintained at the same temperature. The catalyst was heated to 1000° F. at a rate of 10° F. per minute in a 100 cc per minute hydrogen flow. After one hour hydrogen addition was discontinued and the catalyst cooled to 900° F. with a helium purge. At 900° F. the purge was stopped and ortho xylene added at a rate of 2.5±0.5 grams per gram of catalyst per hour. Liquid reactor effluent was collected and analyzed by gas chromatography. The conversion of ortho xylene to meta plus para xylenes was calculated per one-half gram of catalyst. The % conversion of the o-xylene per one-half gram of the standard catalyst under these reaction conditions is 1.1%. The catalytic rate constants for conversion of ortho xylene to meta xylene and para xylene relative to that for an equal weight of the standard commercial platinum-rhenium catalyst were determined by the following equation for the liquid effluent collected between 50 and 70 minutes on stream.

$$\text{Relative Activity} = \frac{\log(1 - X_e) - \log(X - X_e)}{\log(1 - X_e) - \log(Y - X_e)} \quad (1)$$

where $X_e$ = concentration of o-xylene at equilibrium,
$X$ = ortho xylene concentration in the liquid product from one-half gram of the experimental catalyst and
$Y$ = the ortho xylene concentration given at the same conditions by one-half gram of the standard catalyst (R16H). All concentrations are in mole fractions.
This is a first order rate equation for a reaction which can proceed to equilibrium.

At the standard temperature of 900° F. the value of $X_e = 0.25$ and with the specified standard the value of Y was found to be 0.989 so the equation reduces to $$\text{Relative Activity} = \frac{9.8751 - 10 - \log(X - 0.25)}{0.0065} \quad (2)$$

Thus for the purposes of this disclosure the term "standard reforming catalyst" shall mean a specific commercially available reforming catalyst containing 0.37% Pt and 0.20% Re and 0.9% chloride impregnated on gamma alumina (see Example 7) which gives an o-xylene conversion of 1.1% per 0.5 grams at the above specified test conditions.

Later discussion indicates that the mixed zeolite "platinum group metal" on alumina composition may be used in all reactors or only a portion of the reactors depending on the specific product properties and aging characteristics sought. With the zeolite-containing composite in less than all the reactors a conventional non-zeolite catalyst is used in the remainder.

Thus it is necessary to define an activity function for the total catalyst used in the total reformer system. That is, we need to define a relative acid activity for the total catalyst in the system. We have called the function simply K. K for the catalyst system is calculated very simply from the relative activities of the zeolite-containing composite A and of the non-zeolite conventional reforming catalyst B, if present.

K = (Relative Acid Activity of Zeolite
Composite) × (Vol. fraction of Zeolite
Composite) + (Relative Acid Activity of
Non-Zeolite Composite) × (Vol. fraction of
Non-Zeolite Composite). (3)

In practice, K can, as already stated, range from about 1.5 to about 15. Preferably, it will range from about 1.5 to about 10, more preferably from about 2 to about 5.

As will be illustrated hereinafter, it has been found that when the K factor is from 1.5 to about 15 the mixed zeolite-reforming catalysts show significant improvement in stability toward aging during reforming, while still maintaining high liquid yields at high octane number. Conversely, when the K factor is below about 1.5, the catalyst in reforming reactions deteriorates rapidly to a point of inactivity.

Further, K factors above 15 lead to catalysts that are too highly acidic to give optimum liquid reformate yields ($C_5+$) along with the desired resistance to aging. In such catalysts, when the K factor is high, $C_3+$ yields are high, but high octane liquid yields are low. As an example, some fresh zeolites, such as fresh ZSM-5 (as defined below), when mixed directly with conventional reforming catalysts will lead to such results. Specifically, when 2% fresh HZSM-5 was mixed with 98% of a commercial platinum (0.35%) on eta-alumina and used throughout the whole bed, the composite gave very high $C_3$ and $C_4$ yields and low $C_5+$ yields. The K factor of such catalyst was 32.5. Thus, the need for close control of the K factor is evident.

As has already been alluded to, the K factor can be controlled by controlling the acidity, and thus the activity, of the zeolite. Various techniques can be used to control the degree of acidity of the final catalyst composite. One technique is to treat the zeolitic component, either before or after mixing with the platinum metal-alumina component, with air or steam at elevated temperatures e.g. up to about 1700° F. in air or at from about 800° F. to about 1700° F. in steam. It may also be controlled by adding alkali or alkaline earth metals or metal cations to the zeolite, again before or after compositing with the platinum-metal alumina base. Another way is to reduce the alumina content of the zeolite so that the $SiO_2/Al_2O_3$ ratio increases and the cation content decreases. A final illustration is the control of the zeolite content so that the desired degree of acidity is obtained.

Among the zeolites that are useful in the practice of the present invention are tetraethylammonium (TEA) mordenite, calcium faujasite Y (CaY), ZSM-5 (disclosed and claimed in U.S. Pat. No. 3,702,886), ZSM-11 (disclosed and claimed in U.S. Pat. No. 3,709,979) and ZSM-35 (disclosed and claimed in copending U.S. application Ser. No. 528,061, filed Nov. 29, 1974, now U.S. Pat. No. 4,016,245). The patents and the U.S. application referred to are hereby incorporated herein by reference. ZSM-5 has the characteristic X-ray diffraction pattern as set forth in Table 1 hereinbelow. It can also be identified, in terms of mole ratios of oxides, as follows:

$$0.9 \pm 0.2\ M_{2/n}O:W_2O_3:5\text{-}300\ YO_2:zH_2O$$

wherein M is a cation, n is the valence of said cation, W is selected from the group consisting of aluminum and gallium, Y is selected from the group consisting of silicon and germanium, and z is from 0 to 40.

Preferably the mole ratios of oxides will be as follows:

$$0.9 \pm 0.2\ M_{2/n}O:W_2O_3:5\text{-}300YO_2:zH_2O$$

where M, n W, Y and z are as just defined. In a preferred synthesized form, the zeolite has a formula, in terms of mole ratios of oxides as follows:

$$0.9 \pm 0.2 M_{2/n}O:Al_2O_3:5\text{-}100SiO_2:zH_2O$$

and M is selected from the group consisting of a mixture of alkali metal cations, especially sodium, and alkylammonium cations, the alkyl groups of which preferably contain from 2 to 5 atoms.

In a preferred embodiment of ZSM-5, W is aluminum, Y is silicon and the silica/alumina mole ratio is above 5 and generally at least 10 and ranges up to at least 100.

ZSM-5 possesses a definite distinguishing crystalline structure whose x-ray diffraction pattern shows the following significant lines:

TABLE 1

| Interplanar Spacing d(A) | Relative Intensity |
|---|---|
| 11.1 ± 0.2 | S |
| 10.0 ± 0.2 | S |
| 7.4 ± 0.15 | W |
| 7.1 ± 0.15 | W |
| 6.3 ± 0.1 | W |
| 6.04 ± 0.1 | W |
| 5.97 ± 0.1 | W |
| 5.56 ± 0.1 | W |
| 5.01 ± 0.1 | W |
| 4.60 ± 0.08 | W |
| 4.25 ± 0.08 | W |
| 3.85 ± 0.07 | VS |
| 3.71 ± 0.05 | S |
| 3.64 ± 0.05 | M |
| 3.04 ± 0.03 | W |
| 2.99 ± 0.02 | W |

These values as well as all other x-ray data were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these the relative intensities, $100 I/I_o$, where $I_o$ is the intensity of the strongest line or peak, and d (obs.), the interplanar spacing in A, corresponding to the recorded lines, were calculated. In Table I the relative intensities are given in terms of the symbols S=strong, M=medium, W=weak and VS=very strong. It should be understood that this x-ray diffraction pattern is characteristic of all the species of ZSM-5 compositions. Ion exchange of the sodium ion with cations reveals substantially the same pattern with some minor shifts in interplanar spacing and variation in relative intensity. Other minor variations can occur depending on the silica to alumina ratio of the particular sample, as well as if it has been subjected to thermal treatment.

Zeolite ZSM-5 can be suitably prepared by preparing a solution comprising water, tetrapropyl ammonium hydroxide and sources of sodium oxide, an oxide of aluminum or gallium and an oxide of silicon, and having a composition in terms of mole ratios of oxides, falling within the ranges shown in Table 2.

TABLE 2

|  | Broad | Preferred | Particularly Preferred |
|---|---|---|---|
| $OH^-/SiO_2$ | 0.07–1.0 | 0.1–0.8 | 0.2–0.75 |
| $R_4N^+/(R_4N^+ + Na^+)$ | 0.2–0.95 | 0.3–0.9 | 0.4–0.9 |
| $H_2O/OH^-$ | 10–300 | 10–300 | 10–300 |
| $YO_2/W_2O_3$ | 5–100 | 10–60 | 10–40 | wherein R is propyl, W is aluminum and Y is silicon. This mixture is maintained at reaction conditions until the crystals of the zeolite are formed. Thereafter the crystals are separated from the liquid and recovered. Typical reaction conditions consist of a temperature of from about 75° C. to 175° C. for a period of about six hours to 60 days. A more preferred temperature range is from about 90° to 150° C., with the amount of time at a temperature in such range being from about 12 hours to 20 days.

The digestion of the gel particles is carried out until crystals form. The solid product is separated from the reaction medium, as by cooling the whole to room temperature, filtering and water washing.

The ZSM-5 is preferably formed as an aluminosilicate. The composition can be prepared utilizing materials which supply the elements of the appropriate oxide. Such compositions include, for an aluminosilicate, sodium aluminate, alumina, sodium silicate, silica hydrosol, silica gel, silicic acid, sodium hydroxide and tetrapropylammonium compounds. It will be understood that each oxide component utilized in the reaction mixture for preparing a member of the ZSM-5 family can be supplied by one or more initial reactants and they can be mixed together in any order. For example, sodium oxide can be supplied by an aqueous solution of sodium hydroxide, or by an aqueous solution of sodium silicate; tetrapropylammonium cation can be supplied by the bromide salt. The reaction mixture can be prepared either batchwise or continuously. Crystal size and crystallization time of the ZSM-5 composition will vary with the nature of the reaction mixture employed.

Zeolite ZSM-5 may also be prepared, in situ, by preparing a solution containing sources of silica, alumina, alkali, water and precursors to organo-ammonium cations. These precursors consist of compounds characterized by the formulas: $R_1R_2R_3N$ where $R_1$, $R_2$ and $R_3$ are selected from the group consisting of aryl, substituted aryl, alkyl, substituted alkyl, cycloalkyl, substituted cycloalkyl, and hydrogen and $R_4X$, where $R_4$ is selected from the group consisting of alkyl, substituted alkyl, cycloalkyl, substituted cycloalkyl, aryl and substituted aryl and X is an electronegative group. It is to be noted that the precursor to the organo-ammonium compound can be entirely made up of the compound characterized by the formula: $R_1R_2R_3N$.

This in situ formation of the highly substituted cation may be represented by the following equation:

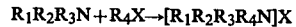

$$R_1R_2R_3N + R_4X \rightarrow [R_1R_2R_3R_4N]X$$

where $R_1$, $R_2$ and $R_3$ are selected from the group consisting of alkyl, substituted alkyl, aryl, substituted aryl, cycloalkyl, substituted cycloalkyl, and hydrogen and $R_4$ is selected from the group consisting of alkyl, substituted alkyl, cycloalkyl, substituted cycloalkyl, aryl and substituted aryl and X is a hydroxy or a group such as chloride, bromide, iodide, sulfate, phosphate, sulfonate, sulfite, carboxylate and carbonate. This in situ reaction takes place in the presence of sources of alkali, water, $SiO_2$ and $Al_2O_3$. This in situ reaction is highly unexpected in the presence of such alkali.

The compound represented by the formula $R_1R_2R_3N$ may be replaced by compounds that contain nitrogen in an aromatic ring such as pyridine, quinoline, or acridine. The nitrogen may also be contained in a saturated ring such as piperdine or 1, 2, 3, 4 tetrahydroquinoline. Additionally, $R_1R_2R_3N_4$ may be replaced by a compound that contains two or more nitrogen atoms such as ethylenediamine.

Table 3 lists the broad and preferred ranges for the reaction mixture necessary to synthesize members of the ZSM-5 family (i.e. ZSM-5 and ZSM-11).

TABLE 3

| | Broad | Preferred |
|---|---|---|
| $\dfrac{R_1R_2R_3N + R_4X}{R_1R_2R_3N + R_4X + M}=$ | 0.1–0.98 | 0.15–0.80 |
| $\dfrac{R_4X}{R_1R_2R_3N}=$ | 0–2 | 0–1.5 |
| $\dfrac{M_2O}{SiO_2}=$ | 0.01–0.5 | 0.03–0.3 |
| $\dfrac{H_2O}{M_2O}=$ | 50–2,000 | 60–1,000 |
| $\dfrac{SiO_2}{Al_2O_3}=$ | 1–300 | 2–150 | wherein M=alkali metal and at least one of the R groups is preferably $C_3H_7$.

The resulting solutions are stirred thoroughly and crystallized at a temperature above about 212° F. and below 700° F. in order to achieve crystallization in less than a week. The temperature is preferably about 250° to 500° F. The reaction is carried out at essentially autogenous pressure of 15 to 500 p.s.i.g. for a time not less than 15 minutes. Excess pressure due to inert gases in the reaction mixture are not harmful. The reaction is carried out in a closed vessel capable of withstanding the pressures in this reaction. The resulting solid crystallized aluminosilicate can be removed, filtered and washed with water at about 60° to 200° F.

The zeolites used in the instant invention usually have the original cations associated therewith replaced by a wide variety of other cations according to techniques well known in the art. Typical replacing cations would include hydrogen, ammonium, and metal cations including mixtures of the same. Of the replacing cations, particular reference is given to cations of hydrogen, ammonium, rare earth, magnesium, calcium, zinc, copper, silver, platinum, palladium, nickel and mixtures thereof. The metals may be also added by impregnation.

Typical ion exchange techniques would be to contact the particular zeolite with a salt of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249, 3,140,251 and 3,140,253.

Following contact with the salt solution of the desired replacing cation, the zeolites may be washed with water and dried at a temperature ranging from 150° F. to about 600° F. and thereafter may be heated in air or other inert gas at temperatures ranging from about 500° F. to 1,700° F. for periods of time ranging from 1 to 48 hours or more.

It is also possible to treat the zeolite with steam at elevated temperatures ranging from 800° F. to 1,600° F. and preferably 1,000° F. and 1,500° F. if such is desired. The treatment may be accomplished in atmospheres consisting partially or entirely of steam.

A similar treatment can be accomplished at lower temperatures and elevated pressure, e.g. 350°–700° F. at 10 to about 200 atmospheres.

Reforming in the presence of the catalyst described herein generally takes place at about 0.5 to about 50 WHSV, about 800° to about 1050° F., at about 85 to about 500 psig pressure and about 1 to about 10 molar ratio of hydrogen to hydrocarbons. Such conditions are referred to as "reforming conditions". Preferably the WHSV is about 1 to about 20. It is understood that one or more reactors in sequence may be employed in the reforming operation. The catalyst of our invention may contain zeolite composite A, whether a physical or an intimate mixture, in all or only part of the reactors. Preferably zeolite composite A comprises an intimate mixture of the zeolite particles in the platinum-metal-alumina base, and is used in the last reactor.

As is shown in Example 1, infra, the zeolite containing composite may be achieved by pre-milling a conventional reforming composition alone in a ball mill for 24 hours, mixing the pre-milled composition with the zeolite and ballmilling for two hours. This is generally followed by pelleting the final composite to a desired pellet size. Other methods of compositing are also useful. For example, the zeolite may be added to alumina sols or slurries either before or after the Pt metal is added.

In preparing the zeolitic composite the proper balance between the amount of zeolitic component and the conventional reforming catalyst component will depend upon the charge stock and operating conditions. However, it should be noted that one of the advantages of this invention lies in the degree of activity with attendant stability, that the zeolitic component possesses. This high activity, while usefully high up to sizes of 10 microns, will be highest when crystallites are less than about 2 microns in size, preferably less than about 1 micron, in weight mean particle diameter, allows for an appreciable degree of flexibility in catalyst composition within the bounds defined for the K factor, and in operating conditions, including in this regard the presence of materials normally thought of as inhibitors in the reforming process. These inhibitors include nitrogen and sulfur containing compounds.

Generally ion exchange, washing, calcination, steaming and other such operations performed on the zeolite should be carried out prior to combining with the carrier material. Admixture of the zeolite with the conventional reforming catalyst may be accomplished by physically mixing the same either directly or after compositing in a matrix.

When the zeolitic catalyst and conventional reforming catalyst are mixed as large particles, for example, greater than about 40 mesh, the zeolite may be dispersed in a hydrous oxide matrix such as silica, alumina, magnesia and clay. Generally, the amount of zeolite will fall within the range of from about 1% to about 70% by weight of the zeolite-matrix system.

Additionally, the platinum type metal may be added to the zeolite, either before or after admixture thereof with a matrix. When the composite comprises an intimate mixture of zeolite and conventional reforming catalyst, the platinum type metal may be combined with the alumina, either before or after incorporation of the zeolite.

In all these various embodiments, the product aging is diminished and the selectivity is substantially changed at a given octane number from that given by the conventional reforming catalyst alone at the same octane severity. In all cases the gaseous products contain more $C_3$ and $C_4$ than $C_1$ and $C_2$. Further, the operating severity needed to reach a given octane number is less for the combination catalyst of this invention than the reforming catalyst alone.

The naphtha charge stocks which can be reformed over the catalysts of this invention include typical reforming stocks, namely virgin naphthas, cracked naphthas and partially reformed naphthas.

The following examples will illustrate the advantages of the catalyst of this invention.

EXAMPLE 1

This example illustrates the preparation of one of the zeolites used in the practice of this invention, i.e. HZSM-5. This component was made as follows:

| | |
|---|---|
| A. Sodium aluminate solution | |
| 0.56 lbs. NaAlO$_2$ | 44.7 wt. % Al$_2$O$_3$ |
| | 33.5 wt. % Na$_2$O |
| | 21.8 wt. % water |
| 14.0 lbs. H$_2$O | |
| B. Sodium silicate solution | |
| 44.7 lbs. Q Brand Silicate | 28.9 wt. % SiO$_2$ |
| | 8.9 wt. % Na$_2$O |
| | 62.2 wt. % water |
| 56.0 lbs. water | |
| C. Quaternary salt solution | |
| 5.6 lbs. tetrapropylammonium bromide | |
| 28.0 lbs. water | |
| D. Acid solution | |
| 4.47 lbs. H$_2$SO$_4$ 97 wt. % | |
| 14.0 lbs. water | |

These solutions were mixed together by adding solution C to solution B, then adding solution A to solution BC, followed by adding solution D to solution ABC. All of these solutions were added together while stirring rapidly. The resulting mixture was heated to 200°–210° F. and held for 167 hours until the crystalline aluminosilicate product formed.

The synthesized ZSM-5 was then washed free of soluble salts, dried, and calcined to remove the combustible organics. The calcined crystalline ZSM-5 was subsequently contacted four times with a hot solution of 5 wt. % ammonium chloride to reduce the residual sodium content to about 0.01 wt. %. Filtration was used to separate the crystallites from the exchange solution after each contact. Finally the exchanged NH$_4$ ZSM-5 was washed free of chloride ion, dried at 230° F., and calcined for 10 hours at 1000° F.

The resulting HZSM-5 was composited with a commercial reforming catalyst containing 0.35 wt. % Pt and 0.35% chloride on an eta-alumina base (RD 150 C as manufactured by Engelhard Mineral and Chemical Company). Compositing was achieved by ballmilling for two hours. The conventional reforming catalyst was pre-milled alone in a ball mill for 24 hours prior to compositing with the HZSM-5 prepared above. The final composite was pelleted by slugging to form ⅛" diameter pellets which were crushed to 14 to 25 mesh. These particles had an apparent density of 0.76 g/cc and a Relative Activity value of 46.5.

The reforming activity of this composite, referred to as the catalyst of Example 1, was tested with a pretreated C$_6$-330° F. Kuwait naphtha as the charge stock (see Table 4). The results of this test are summarized in Table 5. The conditions of the run are shown in the table. This catalyst, which contains 10% HZSM-5 (by weight) produced 37.7% C$_5$+ liquid product at an aromatic level of 80.2 weight percent for the 12 liquid hourly space velocity, (LHSV) run. At 50 LHSV the C$_5$+ product has increased to 56.9% and the aromatics level approached 50%, with excellent gaseous product distribution. Thus, this catalyst with a K value of 46.5 is useful not for conventional reforming but rather is useful for producing high yields of C$_3$'s and C$_4$'s along with high octane gasoline.

EXAMPLE 2

A composite which contained 10% (by weight) of HZSM-5 was prepared using the same materials and techniques described in detail under Example 1 except that the same HZSM-5 was steamed for 20 hours at 1225° F. with 100% steam at atmospheric pressure prior to compositing. The final composite in 14 to 25 mesh size had an apparent density of 0.73 g/cc and a Relative Activity value of 31.1.

The reforming activity of this composite was also tested with a pretreated C$_6$-330° F. Kuwait naphtha (Table 4) as the charge stock. The results of this test with this composite spread throughout the entire reforming reactor are summarized in Table 5. The conditions of the run are shown in the table. The K factor for this system was 31.1 and is not a catalyst of this invention, since it is still over active like Example 1, and like Example 1, it is useful not for conventional reforming but for producing high yields of C$_3$'s and C$_4$'s along with high octane gasoline.

In the front 90 volume percent of the catalyst bed of a reformer reactor (nearest the inlet) was placed 3.5 cc of a pure commercial platinum-rhenium on alumina. In the exit 10 volume % of the reactor was placed 0.5 cc of the composite prepared above in Example 2. The total catalyst system with a K factor of 4.0 was tested for reforming activity with a pretreated C$_6$-330° F. Kuwait Naphtha. The conditions and results are shown in Table 5. When this catalyst was tested as in Table 5 the product distribution at both 900° and 920° F. improved to give more liquid product than the system above where the 10% steamed HZSM-5 was used throughout the bed. Likewise the gas distribution was vastly superior to the product distributions obtained with the commercial bi-metallic platinum-rhenium-alumina alone at 940° F. These data are shown in Table 5 and indicate that the addition of a small amount of HZSM-5 composite caused a great change in the product distribution; specifically, in the C$_4$ and lighter product.

In all of the runs presented in Table 5 with zeolite catalysts, the combined C$_3$ and C$_4$ concentrations in the gas product exceeds 75 weight percent, so that the C$_1$-C$_2$ concentration never exceeds about 20%. In a typical commercial platinum/rhenium on alumina reforming run in the absence of a ZSM-5 type zeolite, as shown in Table 5, C$_1$-C$_2$ concentrations account for at least about 40% (wt.) of the gas product.

TABLE 4

Physical Properties of Hydrodesulfized Reforming Naphtha Feed[1]

| Naphtha Source | C$_6$-330° F. Kuwait Naphtha | C$_6$-290° F. North American Mid-Continent Naphtha |
|---|---|---|
| Specific Gravity | 0.7286 | 0.7385 |
| Sulfur, ppm | 1.0 | 0.8 |
| Nitrogen, ppm | <0.2 | <0.2 |
| Chlorine, ppm | <0.1 | 0.7 |
| Composition, vol. % | | |
| C$_4$ and lighter | trace | none |
| iC$_5$ | 0.1 | 0.1 |
| nC$_5$ | 0.5 | 0.6 |
| C$_6$ plus | 99.6 | 99.3 |

TABLE 4-continued

| | Physical Properties of Hydrodesulfized Reforming Naphtha Feed[1] | |
|---|---|---|
| Naphtha Source | C$_6$-330° F. Kuwait Naphtha | C$_6$-290° F. North American Mid-Continent Naphtha |
| Composition, wt. % | | |
| Paraffins | 68.0 | 50.9 |
| Monocycloparaffins | 19.5 | 40.2 |
| Dicycloparaffins | 1.1 | 0.1 |
| Aromatics | 11.4 | 8.8 |
| Research Octane Number | 49 | 55 |

[1]Naphthas referred to herein were pretreated with pure hydrogen at 500 psig, 700° F., 5 LHSV over a commercial cobalt molybdena hydrotreating catalyst.

TABLE 5

C$_6$-330° F. Kuwait Naphtha Reforming Over HZSM-5/Pt/Al$_2$O$_3$

| Catalyst | Fresh Catalyst of Example 1 | | | Steamed Catalyst of Example 2 | | |
|---|---|---|---|---|---|---|
| Temp. °F. | 900 | 900 | 900 | 900 | 900 | 950 |
| LHSV (vol.Liq.per vol. cat. per hr.) | 12 | 50 | 50 | 50 | 12 | 12 |
| Pressure (psig) | 200 | 200 | 200 | 200 | 200 | 200 |
| Hours on Stream | 4.5 | 5 | 24 | 5 | 5 | 10 |
| Weight Charge, grams | 2.19 | 2.19 | 2.19 | 2.19 | 2.19 | 2.19 |
| Weight Product, grams | 2.04 | 2.07 | 2.12 | 2.09 | 2.16 | 1.91 |
| Liquid, grams | 0.81 | 1.19 | 1.23 | 1.90 | 1.60 | 1.26 |
| Gas, grams | 1.23 | 0.88 | 0.89 | 0.19 | 0.56 | 0.64 |
| Wt. % Recovery | 93.4 | 94.5 | 97.0 | 95.8 | 98.6 | 87.3 |
| Wt. % C$_5$+ | 37.7 | 55.1 | 56.9 | 87.0 | 73.7 | 58.9 |
| Wt. % C$_4$- | 55.8 | 39.4 | 40.1 | 8.8 | 24.9 | 23.4 |
| Wt. % Arom. in C$_5$+ | 80.2 | 49.9 | 48.2 | 33.3 | 46.0 | 55.2 |
| Gas Composition, Wt. % | | | | | | |
| C$_1$ | 1.6 | 0.8 | 0.7 | 1.7 | 1.4 | 0.9 |
| C$_2$ | 11.4 | 6.6 | 7.0 | 7.2 | 4.3 | 9.2 |
| C$_3$ | 66.7 | 66.7 | 67.5 | 69.8 | 62.5 | 72.1 |
| C$_4$ | 19.2 | 24.1 | 23.1 | 20.2 | 29.8 | 15.3 |
| C$_5$ | 1.1 | 1.7 | 1.6 | 1.1 | 1.9 | 2.6 |
| Cat. Vol. (cc) | 0.5 cc | 0.12 cc | 0.12 cc | 0.12 cc | 0.5 cc | 0.5 cc |

| Catalyst | Commercial Catalyst[2] Pt/Re/Al$_2$O$_3$ | | Example 2[3] | |
|---|---|---|---|---|
| Temp. °F. | 940 | 940 | 920 | 900 |
| LHSV | 1.5 | 1.5 | 1.5 | 1.5 |
| Pressure, psig | 200 | 200 | 200 | 200 |
| Hours on Stream | 22 | 45 | 5 | 24 |
| Weight Charge, grams | — | 2.19 | 2.19 | 2.19 |
| Weight Product, grams | — | 2.01 | 2.06 | 2.17 |
| Liquid, grams | — | 1.49 | 1.37 | 1.48 |
| Gas, grams | — | 0.52 | 0.69 | 0.69 |
| Wt. % Recovery | — | 91.8 | 94.2 | 96.4 |
| Wt. % C$_5$+ | — | 68.4 | 63.3 | 66.5 |
| Wt. % C$_4$- | — | 23.4 | 30.9 | 29.9 |
| Wt. % Arom. in C$_5$+ | 62.8 | 54.6 | 62.2 | 63.6 |
| Gas Composition, Wt. % | | | | |
| C$_1$ | 15.4 | 9.8 | 5.9 | 0.6 |
| C$_2$ | 45.4 | 32.3 | 14.8 | 5.1 |
| C$_3$ | 32.6 | 40.9 | 51.7 | 63.8 |
| C$_4$ | 6.3 | 15.9 | 25.4 | 27.9 |
| C$_5$ | 0.3 | 1.1 | 2.0 | 2.5 |
| Cat. Vol. (cc) | | | 4.0 cc | |

[1]The properties of the charge stock used in these runs are listed in Table 4.
[2]The catalyst contained 0.35% by weight of each of platinum and rhenium. The alumina used was eta alumina having a crystal size of 40-60 Angstroms.
[3]Test involving the catalyst system having conventional reforming catalyst in first 90% of the reactor and the catalyst comprising steamed HZSM-5 in the last 10% of the reactor.

EXAMPLE 3

In preparing this catalyst composite containing 1% wt. steamed HZSM-5 and 99 wt. % commercial Pt-alumina, the individual components were prepared separately and then composited.

In this case the ZSM-5 was synthesized by first pre-reacting the following solutions:

A. Sodium silicate solution
  42.2 lbs. Q Brand Silicate { 28.9 wt. % SiO
  8.9 wt. % Na$_2$O
  62.2 wt. % H$_2$O
  58.8 lbs. water
    Sp. Gr. 1.151 @ 73° F.
B. Acid alum solution
  72.2 lbs. water
  1.44 lbs. Al$_2$(SO$_4$)$_3$ . 18H$_2$O
  3.52 lbs. H$_2$SO$_4$
  15.8 lbs. NaCl
    Sp. Gr. 1.158 @ 85° C.

These solutions were mixed together continuously through a mixing nozzle flowing the acid solution at 538 cc/min and the silicate solution at 498 cc/min forming an 8.9 pH hydrogel. This mixture was formed into bead hydrogel in the typical bead-forming method. This involves flowing the resulting hydrosol into an oil layer. The stream forms beads that gel into firm bead hydrogel. The resulting bead hydrogel was charged to a 30 gallon autoclave along with 2.8 lbs. tri-n-propyl amine and 2.44 lbs. of n-propyl bromide. This reaction mixture was allowed to react, while stirring, for 19 hours at about 275° to 320° F., forming the crystalline organoaluminosilicate, ZSM-5.

The crystalline product was separated from the supernatant liquor by filtration, followed by water washing at about 190° F. to remove all soluble salts. The washed material was dried at 230° F. and was calcined for 3 hours at 700° F. in air to remove all carbonaceous material. The ammonium chloride base exchange of this calcined ZSM-5 consisted of 4-1 hour stirred contacts at 190°-200° F. with ammonium chloride using 5 ml of 5 wt. % ammonium chloride per gram of calcined ZSM-5. The slurry was filtered after each contact, followed by water washing free of chloride ion after last contact. The washed cake was subsequently dried at 230° F. and re-calcined for 10 hours at 1000° F., followed by steaming at 1225° F. for 24 hours with 100% steam at atmospheric pressure.

The resulting steamed HZSM-5 was composited with ballmilled commercial 0.35 wt. % Pt on eta-alumina as described under Example 1, the relative quantities being such as to give 1% HZSM-5 in the final composite The final composite pelleted and sized 14 to 25 mesh had an apparent density of 0.70 g/cc and had a Relative Activity value of 3.4.

The reforming activity of this catalyst composite was tested throughout the bed with the $C_6$-330° F. Kuwait Naphtha in Table 4 as a charge stock. The K value was 3.4, the same as the Relative Activity value. The conditions of the run and the results are shown in Table 6. These results indicate that even at extremely low levels of intimately mixed HZSM-5 (Example 3 composite) the combined $C_3$-$C_4$ concentration in the gas product is 80% or greater. Even when the pressure was lowered to 100 psig, no apparent effect was observed on product distribution. Additionally, this catalyst showed no indication of aging during the course of operation.

$C_5+$ clear research octane gain of 7.3 numbers over the standard 0.6 wt.% $Pt/Al_2O_3$ (101.8 versus 94.5). The comparison of these two catalysts at more nearly the same octane level (standard $Pt/Al_2O_3$ at 905° F., catalyst of Example 3 at 870° F.) shows more than a 35° F. advantage for the HZSM-5 catalyst over the standard.

The gaseous product distributions at the 94.5/96.4 octane level for the liquid product show a decrease in $C_1+C_2$ yield with a corresponding increase in $C_3$ and $C_4$ yields. In the $C_4$ isomer fraction, the isomer distribution shows isobutane yield is greater than normal butane yield for the ZSM-5 composite of Example 3, whereas for the standard $Pt/Al_2O_3$ this ratio is reversed.

TABLE 7

$C_6$-290 Mid-Continent Naphtha Reforming[1]

| Catalyst: | 0.6 wt. % $Pt/Al_2O_3$ | Example 4 | Example 4 |
|---|---|---|---|
| Pressure (psia) | 200 | 200 | 200 |
| Moles $H_2$/mole HC | 9.6 | 9.6 | 9.6 |
| LHSV | 1.7 | 1.7 | 1.7 |
| Temperature °F. | 905 | 905 | 870 |
| $C_5+$ RNO + O | 94.5 | 101.8 | 96.4 |
| $C_1 + C_2$ (wt. %) | 1.8 | 3.0 | 1.6 |
| $C_3$ (wt. %) | 2.4 | 9.1 | 7.7 |
| $iC_4$ (wt. %) | 1.3 | 5.7 | 5.5 |
| $nC_4$ (wt. %) | 1.6 | 4.1 | 3.6 |
| $C_5+$(vol. %) | 83.4 | 69.7 | 74.4 |
| $C_4+$(vol. %) | 87.1 | 82.3 | 85.9 |

[1]Properties of naphtha charge in Table 4.

EXAMPLE 5

18.6 cc of a commercial conventional reforming catalyst containing 0.6 wt.% Pt on eta-$Al_2O_3$ was placed in the inlet end of a reforming test reactor. This was immediately followed (toward exit end) by 6.4 cc of the composite of Example 3. This reactor load with a K factor of 2.5 was placed in an isothermal reforming test unit

TABLE 6

$C_6$-330° F. Kuwait Naphtha Reforming With Steamed 1% HZSM-5-99% (0.35 Pt/n$Al_2O_3$)[1]

Catalyst: Example 3; $H_2$/HC 7/1; Charge: $C_6$-330 Kuwait Naphtha; LHSV 1.5

| Temp. °F. (920° F.) | 918 | 916 | 917 | 917 | 917 | 918 | 918 | 918 | 918 | 916 |
|---|---|---|---|---|---|---|---|---|---|---|
| LHSV[2] | 1.5 | | | | | | | | | |
| Pressure (psig) | 200 | | | | | | | | 200/100 | 100 |
| Hours on Stream | 4 | 12 | 32 | 35 | 55 | 59 | 83 | 103 | 108 | 127 |
| Weight Charge, grams | 2.18 | 2.19 | 2.19 | 2.20 | 2.20 | 2.21 | 2.22 | 2.22 | 2.23 | 2.22 |
| Weight Product, grams | 1.16 | 1.80 | 1.80 | 1.92 | 2.01 | 1.68 | 2.23 | 1.98 | 2.08 | 2.10 |
| Liquid, grams | 0.71 | 1.14 | 1.19 | 1.26 | 1.39 | 1.28 | 1.41 | 1.26 | 1.39 | 1.39 |
| Gas, grams | 0.45 | 0.66 | 0.61 | 0.66 | 0.61 | 0.40 | 0.82 | 0.72 | 0.69 | 0.71 |
| Wt. % Recovery | 53.1 | 82.3 | 82.2 | 87.2 | 91.2 | 76.1 | 100.1 | 89.1 | 93.4 | 94.5 |
| Wt. % $C_5+$ | 32.7 | 52.6 | 54.7 | 57.9 | 63.7 | 57.9 | 64.3 | 57.2 | 63.0 | 63.3 |
| Wt. % $C_4-$ | 20.4 | 29.7 | 27.5 | 29.3 | 27.4 | 18.2 | 25.8 | 31.8 | 30.3 | 31.2 |
| Wt. % Arom. in $C_5+$ | 74.1 | 66.8 | 62.8 | 63.8 | 62.4 | 60.2 | 61.3 | 57.9 | 62.1 | 60.9 |
| Gas Composition, wt. % | | | | | | | | | | |
| $C_1$ | 5.4 | 4.1 | 4.1 | 2.2 | 4.5 | 4.3 | 3.3 | 3.0 | 3.3 | 2.6 |
| $C_2$ | 20.8 | 15.6 | 14.1 | 10.2 | 12.4 | 15.2 | 11.6 | 9.9 | 10.2 | 8.2 |
| $C_3$ | 58.3 | 58.6 | 55.5 | 54.9 | 55.7 | 59.8 | 52.7 | 54.6 | 54.4 | 55.6 |
| $C_4$ | 14.9 | 20.3 | 24.8 | 30.1 | 25.6 | 19.7 | 29.8 | 30.2 | 39.8 | 31.4 |
| $C_5$ | 0.6 | 1.4 | 1.6 | 2.6 | 1.8 | 0.8 | 2.6 | 2.3 | 2.3 | 2.2 |

[1]For properties of charge stock see Table 4.
[2]Catalyst: 4.0 cc, 2.85 g

EXAMPLE 4

The composite of Example 3 spread throughout the reactor was tested for its reforming activity with a $C_6$-290° F. Mid-Continent naphtha (see Table 4) under conditions shown in Table 7. The K factor for this catalyst was 3.4. The results are compared with a standard commercial 0.6 wt.% platinum on alumina in Table 7. At the same temperature, 905° F., the catalyst of this invention (as exemplified by Example 4) shows a and evaluated for its activity toward reforming the $C_6$-290° F. Mid-Continent naphtha characterized in Table 4. This activity is compared with the standard $Pt/Al_2O_3$ under identical test conditions as shown in Table 8 along with the results. The catalyst of this invention produced a $C_5+$ liquid product having an octane number which is 2.6 research octane numbers greater than the product from the standard $Pt/Al_2O_3$. Furthermore, this was accomplished with a loss of only 4% $C_5^+$ yield and only 1.5% $C_4^+$ yield. The net $C_1+C_2$ yield for the catalyst herein claimed was less than from the standard (2.1 versus 2.3 wt. percent based on charge). Therefore, if the standard $Pt/Al_2O_3$ catalyst was run at increased severity (e.g. higher temperature) to give the same octane number level for the liquid product, the yield of methane plus ethane would be substantially greater than for the HZSM-5 catalyst composite. This is a very desirable catalytic property, since it leads to higher hydrogen purity in operations using recycle gas. The gain in $C_3$ and $C_4$ yield at the expense of $C_1+C_2$ is also a very desirable result.

TABLE 8

| Advantage of Split Bed-HZSM-5 Contained in $Pt/Al_2O_3$ in Reforming a $C_6$-290° F. Mid-Continent Naphtha[1] | | |
|---|---|---|
| Catalyst | Standard $Pt/Al_2O_3$ | Example 5 |
| Hydrogen/Hydrocarbon (mol/mol) | 4 | 4 |
| Vol. Chg/Vol. Cat/Hr | 1.7 | 1.7 |
| Pressure, psia | 200 | 200 |
| Temperature | 900 | 900 |
| Product Properties | | |
| $C_5^+$ Res. Octane (clear) | 95.3 | 97.9 |
| $C_5^+$ vol. Yield | 82.6 | 78.6 |
| $C_4^+$ vol. Yield | 87.2 | 85.7 |
| $C_1 + C_2$ wt. % of Charge | 2.3 | 2.1 |
| $C_3$ | 3.1 | 5.1 |
| $iC_4$ | 1.7 | 3.1 |
| $nC_4$ | 1.9 | 2.5 |

[1]Naphtha properties are shown in Table 4.

Examples 6–17 illustrate specifically the role the K factor plays in the present invention.

EXAMPLE 6

A commercially available conventional reforming catalyst containing 0.37 wt.% platinum, 0.20 wt.% rhenium and 0.9% chloride impregnated on a gamma alumina support was tested for catalytic stability by the following method. Twenty milliliters (20 ml) of the catalyst was loaded into a downflow isothermal reforming reactor. The reactor was heated to 960° F. under a flow of pure hydrogen (40 liters/hour) at 150 psig. The temperature was lowered to 850° F., pure hydrogen addition stopped and a gaseous mixture of hydrogen sulfide in hydrogen (40 ppm $H_2S$ in hydrogen) was passed over the catalyst until hydrogen sulfide was detected in the exit gas. The $H_2S/H_2$ mixture was discontinued and pure hydrogen started at a flow rate of 40.2 liters/hr. Liquid charge stock was pumped into the reactor at a rate of 36 milliliters per hour. The charge stock used here was a hydrogen pretreated $C_6$-330° F. Arabian light naphtha with the properties shown in Table 9. Temperature was increased to 900° F. and held for one hour. Final temperature adjustment was made.

Temperature was chosen here and in subsequent examples to give at the start of thr run a $C_5^+$ liquid product having a clear research octane number of 100±1.5 octane, which for this catalyst was 960° F.

In this aging stability evaluation the average decline in octane number of $C_5^+$ liquid product per day over the course of the run was 0.75 octane number per day. This is the averaged drop over a 16 day run in which the octane number declined from 99.7 on the first day to 88.7 on the 16th day. Periodic octane numbers were taken during the runs. $C_5^+$ volume liquid yield for this catalyst at the start of the run was 73%. $C_3^+$ volume yield was 90%.

Since this is the standard catalyst against which our experimental catalysts were rated for K, by definition K was 1.0

TABLE 9

| Charge Stock: $C_6$-330° F. Arabian Light Naphtha | |
|---|---|
| Wt. % | Properties |
| Paraffins | 68.8 |
| Naphthenes | 18.4 |
| Aromatics | 12.7 |
| Specific Gravity | API 63.0 |
| ASTM Distillation, ° F. | |
| IBP | 168 |
| 10% | 199 |
| 30% | 218 |
| 50% | 241 |
| 70% | 268 |
| 90% | 296 |
| EP | 322 |
| Clear Research Octane | 37.8 |
| Avg. Mol Wt. | 106.4 |
| Wt. % Combined Hydrogen | 14.8 |
| Run Conditions were: | |
| 150 psig total inlet pressure | |
| 7 moles of hydrogen feed per mole of hydrocarbon feed | |
| 1.8 volumes of charge stock per volume of catalyst per hour | |

EXAMPLE 7

A composite catalyst which contained 1% HZSM-5 was prepared as follows: The HZSM-5 was synthesized by the following procedure:

In this case the ZSM-5 was synthesized by first preheating the following solutions:

A. Sodium silicate solution
  94.5 lbs. of Q-Brand Silicate { 28.9 wt. % $SiO_2$
                                  8.9 wt. % $Na_2O$
                                  62.2 wt. % $H_2O$
  54.9 lbs. $H_2O$
B. Acid Aluminum Sulfate solution
  3.02 lbs. $Al_2(SO_4)_3 \cdot H_2O$ (17.2% $Al_2O_3$)
  7.88 lbs. $H_2SO_4$(97%)
  17.7 lbs. NaCl
  56 lbs. $H_2O$ These solutions were premixed in a nozzle and then added to the stirred autoclave. To this mixture in the autoclave was added;
10 lbs. methyl ethyl ketone
6.36 lbs. tripropyl amine
5.47 lbs. n-propyl bromide
and reacted in the static state, no mixing. During this organic reaction the autoclave was heated to 240° F. and held for 14–15 hours to allow the organics and the gel to prereact.

The mixture was then agitated vigorously and heated to and held at 320° F. for 4½ hours. The volatile organics were then distilled off the mixture at this point.

The crystallites were then filtered, washed and exchanged in a manner similar to Example 3. However, in this case the calcined crystals of HZSM-5 were steamed at 1100° F. rather than at 1225° F. as in Example 3.

This steamed HZSM-5 (1.298 grams) was mixed with 243.5 grams of hydrated commercial alumina-monohydrate (50.75% solids, obtained from Continental Oil Co.) in a muller mixer with 25 ml of water for 30 minutes. This mixture was extruded as 1/32" diameter particles, dried 4 hours at 230° F. and heated to 1000° F. at a rate of 2° F./minute and held for 10 hours.

A portion of the above extrudate (88.7 g, 99.7% solids) was placed in an evacuation chamber for 30 minutes and impregnated with 70.6 ml of an aqueous solution which contained 0.338 grams of platinum as hexachloroplatinic acid, 0.338 grams of rhenium as perrhenic acid and 0.456 grams of chloride as hydrochloric acid. After impregnation the extrudate stood for one hour at atmospheric pressure and was then dried at 230° F. for 3½ hours. The dried extrudate was calcined for 3 hours at 1000° F.

The final catalyst composite contained 0.44 wt. % platinum and 0.83% chlorine and had a surface area of 202 square meters per gram.

The Relative Activity factor for the composite of this example as defined by the o-xylene isomerization test was 6.4.

EXAMPLE 8

The composite catalyst of Example 7 was evaluated for aging stability by the method discussed in Example 6 except that the catalyst bed differed. The top of the catalyst bed contained 8 cubic centimeters of the commercial Pt-Re/gamma alumina of Example 6 and bottom 12 cc of the bed was the composite of Example 7. The K factor for this total catalyst system was 4.2. All other conditions of the test were the same except that the temperature needed to reach the desired O.N. was 940° F. This shows the great increase in activity of this catalyst. The average octane number decline during the course of this run was 0.43 octane numbers per day.

This catalyst system is obviously more stable than the conventional Pt-Re/$\gamma$-Al$_2$O$_3$ of Example 6 since the activity declined at a slower rate. The decline in aging rate in this example was 43% less than the aging rate of the standard catalyst of Example 6. Further, the activity of the catalyst of this example is greater since a lower temperature was necessary to give a C$_5$+ liquid product having a 100 clear research octane number. The C$_5$+ liquid yield at the start of the run was 69 volume %. The C$_3$+ yield was 95 volume %.

EXAMPLE 9

A composite catalyst was prepared which contained one wt. % steamed HZSM-5 and 99 wt. % of the conventional reforming catalyst from Example 6. The steamed HZSM-5 was prepared by the method indicated in Example 7. The Pt-Re on alumina material of Example 6 was ball-milled 24 hours prior to using. The composite catalyst of this example was an intimate mixture of 0.90 grams of the HZSM-5 prepared in Example 7 and 90.0 grams of the Pt-Re/$\gamma$-Al$_2$O$_3$ of Example 6. The composite was mixed for 2 minutes in an electric mixer and then ball-milled for one hour. The powder mixture was pelleted and sized to 14/25 mesh particles.

This composite catalyst had a relative activity of 5.2 and was evaluated by the method described in Example 6. The catalyst bed consisted of 8.0 cc of the conventional reforming catalyst of Example 6 in the top of the reactor and 12.0 cc of the composite of this example in the bottom of the bed. The K factor of this total catalyst system was 3.5. The temperature of this test was 930° F. Thus, this catalyst also is much more active than the standard catalyst of Example 6. The C$_5$+ liquid yield at the start of the run was 70 volume %. The C$_3$+ yield was 100 volume %. The octane decline rate of the dual catalyst system described here was 0.31 octanes per day. Its stability is far better than that of the conventional reforming catalyst described in Example 6 which declined at the higher rate of 0.75 octanes/day. The decline in aging rate compared to the standard conventional reforming catalyst (Example 6) is 59%.

EXAMPLE 10

The composite of Example 3 was evaluated by the method described in Example 6. The catalyst bed contained 8.0 cc of the composite of Example 6 in the top of the bed and 12.0 cc of the catalyst of Example 3 in the bottom of the bed. This system had a K factor of 2.4. The temperature of this test was 930° F., again showing the increased catalyst activity. The average octane decline for this test was 0.37 octanes per day which is much less than the decline for the conventional reforming catalyst of Example 6. The decline in aging rate was 51% of the decline rate for the standard reforming catalyst of Example 6. The C$_5$+ yield was 73 volume %. The C$_3$+ yield was 96 volume %.

EXAMPLE 11

The composite of this example was prepared by mixing 10 wt. % steamed H+ (TEA) mordenite with 90 wt. % of the Pt-Re/$\gamma$-Al$_2$O$_3$ of Example 6.

The tetraethylammonium mordenite (referred to as TEA mordenite) was prepared as follows:
A. Sodium aluminate solution
   51 g. NaAlO$_2$
      43.1 wt. % Al$_2$O$_3$, 33.1 wt. % Na$_2$O, 24.3 wt. % H$_2$O
   53.6 g. NaOH
   123 g. Water
B. Organic salt solution
   246 g. tetraethylammonium chloride monohydrate
   123 g. water
C. Silicate solution
   1300 g. colloidal silica sol (30% SiO$_2$)

These solutions were mixed together by adding solution A to B, mixing thoroughly, then adding solution C followed by 10 minutes mixing. The mixture was then charged to a 2 liter Parr autoclave and held at 175° C. for 8 days under pressures of 400–830 psig without stirring. The resulting product was separated from the liquid by filtering and washing.

The crystalline product identified as TEA mordenite by x-ray analysis was first calcined for 10 hours at 1000° F. and then exchanged with NH$_4$Cl to remove residual sodium. In this exchange process 67.5 grams of the Na (TEA) mordenite were contacted with 675 ml of 10% NH$_4$Cl solution for one hour at approximately 180° F. After repeating the NH$_4$Cl exchange four times the (TEA) mordenite was washed until essentially free of chloride ions. The cake was dried at 230° F., pelleted and sized 30 to 60 mesh and recalcined 10 hours at 1000° F. The resulting powder was steamed for 20 hours at 1100° F. in a 100% steam atmosphere prior to compositing with the conventional reforming catalyst of Example 6 in the ratio to constitute 10 wt. % HTEA and 90% Example 6.

This composite catalyst had a relative activity of 4.1 and was evaluated by the method described in Example 6. The catalyst bed contained 8.0 cc of the conventional reforming catalyst of Example 6 in the top of the bed and 12.0 cc of the composite prepared above in this example in the bottom of the bed. The K factor of this catalyst system was 2.9. The temperature of this test was 960° F. The C$_5$+ liquid yield at the start of the run was 65 volume %. The C$_3$+ yield was 94 volume %.

The average octane decline for this test was 0.53 octanes per day which is less than the decline for the conventional Pt-Re of Example 6. The decline in aging rate compared to the standard reforming catalyst of Example 6 was 29%.

EXAMPLE 12

The composite of this example was prepared by mixing one wt. % of a previously steamed CaY impregnated with platinum ammine solution with 99 wt. % of the conventional Pt-Re of Example 6. The particular CaY used in this composite was prepared by exchanging commercial NaY with $CaCl_2$ solution. The NaY base was exchanged by slurring with 10% $CaCl_2$ solution using 10 cc per gram at 180°–200° F. Six two hour contacts reduced residual sodium to 1.3 wt. %. The base was then water washed until chloride free and dried at 230° F. After calcining for 10 hours at 1000° F. the zeolite was steamed for 20 hours at 1200° F. with an atmosphere of 100% steam. The zeolite was then impregnated with one wt. % platinum as platinum ammine complex.

The final composite contained 0.314 g of the Pt-CaY prepared above and 31.1 g of powdered Pt-Re on alumina of Example 6. The Example 6 composite was powdered by ball-milling 24 hours. These powders were mixed on a CRC mill for 2 minutes and pelleted and sized to 14 by 25 mesh particles.

This composite catalyst had a relative activity of 2.4 and was evaluated by the method described in Example 6. The catalyst bed contained 8.0 cc of the composite of Example 6 in the top of the bed and 12.0 cc of the composite of this example in the bottom. The K factor for the total catalyst system was 1.8. The test temperature for this specific run was 940° F., again showing increased catalyst activity. The $C_5^+$ liquid yield at the start of the run was 70 volume %. The $C_3^+$ yield was 94 volume %. The average octane decline for this test was 0.60 octanes per day which is 20% less than the decline of the conventional Pt-Re of Example 6.

EXAMPLE 13

The composite catalyst of this example was prepared by intimate combination of one wt. % of zeolite HZSM-35 and 99 wt. % of the commercial Pt-Re reforming catalyst of Example 6.

The zeolite identified as ZSM-35 was prepared by interacting the following solutions:

A. Caustic Silicate Solution
 1. 508 g. Q-Brand Sodium Silicate which is 8.9 wt.% $Na_2O$, 28.9 wt.% $SiO_2$ and 62.2 wt. % water.
 2. 32.5 g. of 50 wt. % NaOH
 3. 299 g. water
B. Acid Alum Solution
 1. 88 g. $Al_2(SO_4)_3.18 H_2O$
 2. 22.5 g. $H_2SO_4$
 3. 870 g. water
C. Organic
 1. 150 g. ethylenediamine The solutions were mixed in the following order: solution C mixed with A and then with B for 15 minutes. This mixture was charged to a stirred 2 liter Parr Autoclave and heated to 180° C. The stirred mixture was held at 175°–180° C. for 5 days under a pressure of 150–170 psig. The resulting crystalline zeolite identified as ZSM-35 was separated from the supernatent liquid by filtration and washing.

Properties of the resulting ZSM-35 product were as follows:
X-ray—The pattern corresponded to that shown in Table 10
Sorptions:
 normal hexane: 6.4 wt.%
 cyclohexane: 0.9 wt.%
 $H_2O$: 10.6 wt.%
Composition:
 $SiO_2$: 81.3 wt.%
 $Al_2O_3$: 9.38 wt.%

ZSM-35 was calcined 10 hours at 1000° F. in air and then base exchanged at 180° F. with 286 ml of 10 wt.% $NH_4Cl$ solution per 28.6 g of ZSM-35 with stirring. Four contacts left the zeolite essentially sodium free. Finally the exchanged ZSM-35 was washed free of residual chloride ion and then recalcined for 10 hours at 1000° F.

TABLE 10

| d(Å) | I/Io |
|---|---|
| 9.5 ± 0.30 | Very Strong |
| 7.0 ± 0.20 | Medium |
| 6.6 ± 0.10 | Medium |
| 5.8 ± 0.10 | Weak |
| 4.95 ± 0.10 | Weak |
| 3.98 ± 0.07 | Strong |
| 3.80 ± 0.07 | Strong |
| 3.53 ± 0.06 | Very Strong |
| 3.47 ± 0.05 | Very Strong |
| 3.13 ± 0.05 | Weak |
| 2.92 ± 0.05 | Weak |

A composite of 0.344 g. of the HZSM-35 and 30.7 g of the conventional reforming catalyst of Example 6, which was previously powdered by ball-milling 24 hours, was mixed 2 minutes in a CRC mill, then pelleted and sized 14×25 mesh. This final composite had a relative activity of 2.0 and was evaluated by the method described in Example 6 with the exception that at the run temperature of 930° F. the octane at the beginning of the test was only 97.2. The catalyst bed contained 8.0 cc of the Pt-Re on alumina of Example 6 in the top of the bed and 12.0 cc of the composite of this example in the bottom of the bed. The K factor for this system was 1.6. The average octane decline for this test was 0.70 octanes per day. This represents a 6% decrease in aging rate compared to the standard reforming catalyst of Example 6. The $C_5^+$ liquid yield at the start of the run was 75 volume %. The $C_3^+$ yield was 93 volume %.

The following examples (14–17) are included merely for the purpose of comparison.

EXAMPLE 14

The composite catalyst of this example was prepared by intimate combination of 3 wt. % of steamed zeolite HZSM-35 and 97 wt. % of the Pt-Re on alumina catalyst of Example 6. The HZSM-35, prepared by the method described in Example 13, was steamed for 20 hours at 1100° F. in 100% steam atmosphere before compositing with the powdered conventional reforming catalyst of Example 6. This powder mixture was mixed in a CRC mill for 2 minutes and then pelleted and sized 14 to 25 mesh.

The composite had a relative activity of 0.6 and was evaluated by the method described in Ex. 6. The catalyst bed contained 8.0 cc of the Pt-Re/alumina of Ex. 6 in the top of the bed and 12.0 cc of the composite of this example in the bottom of the bed. The K factor for this system was 0.8. The temperature of this test was 950° F. The C5+ liquid yield at the start of the runs was 74 volume %. The C3+ yield was 90 volume %. The average octane decline for this test was 0.77 octanes per day. Therefore the catalyst system of this example shows no added stability over the commercial Pt-Re catalyst of Example 6.

EXAMPLE 15

The composite of this example was prepared by mixing 0.25 wt. % of an acid (TEA) mordenite with 99.75 wt. % of powdered Pt-Re catalyst of Example 6. The acid TEA mordenite was prepared by the method in Example 11 except the calcined zeolite was not subjected to steaming. The composite was pelleted and sized to 14 to 25 mesh particles.

This composite had a relative activity of 1.3 and was evaluated by the method described in Example 6. The catalyst bed contained 8.0 cc of the conventional reforming catalyst of Example 6 in the top of the bed and 12.0 cc of the composite of this example in the bottom of the bed. The K factor for this system was 1.2. The temperature of the test was 930° F. The C5+ liquid yield at the start of the run was 72 volume %. The C3+ yield was 95 volume %. The average octane decline for this test was 0.74 octanes per day. The small amount of zeolite in this catalyst failed to stabilize this catalyst system.

EXAMPLE 16

The composite catalyst of this example was prepared by compositing one wt. % of a steamed CaY and 99 wt. % of powdered Pt-Re catalyst of Example 6. The CaY was prepared by the method described in Example 12 except the conditions for steaming the freshly calcined CaY was 20 hours at 1300° F. in an atmosphere of 100% steam. This sample which contained no platinum, was mixed thoroughly with Pt-Re/alumina of Example 6 in a CRC mill for 2 minutes. The powder mixture was pelleted and sized to 14×25 mesh particles.

This composite had a relative activity of 1.1 and was evaluated by the method described in Example 6. The catalyst bed contained 8.0 cc of Pt-Re catalyst of Example 6 in the top of the bed and 12.0 cc of the composite of this example in the bottom of the bed. The K factor of this system was 1.1. The test temperature was 950° F. The C5+ liquid yield at the start of the run was 74 volume %. The C3+ yield was 90 volume %. The average octane decline for this test was 0.98 octanes per day. This catalyst system is less stable than the catalyst of Example 6.

EXAMPLE 17

The composite of this example was prepared by compositing 1.15 g (2%) of acid mordenite with 49.15 g. (98%) of the commercial Pt-Re/alumina of Example 6. The mordenite with a silica to alumina ratio of 10 was a commercial sample designated Zeolon H Type 100. The conventional Pt-Re/alumina of Example 6 had been previously ball-milled for 24 hours. The above composite was ball-milled for 2 hours and then pelleted and sized 14×25 mesh. This composite catalyst had a relative activity of 0.8 and was evaluated by the method described in Example 6. The catalyst bed contained 8.0 cc of the Pt-Re standard of Example 6 in the top of the bed and 12.0 cc of the composite of this example in the bottom of the bed. The K factor of this catalyst system was 0.9. The temperature of the test was 960° F. The C5+ liquid yield at the start of the run was 73 volume %. The C3+ yield was 91 volume %. The average octane decline for this test was 0.88 octanes per day which is more than the 0.75 O/D for the commercial Pt-Re catalyst of Example 6.

EXAMPLE 18

Since a substantial gain in stability (decline in aging rate) was found for our preferred catalysts in this accelerated test using a simple isothermal reactor, the following was done to see how large an improvement in aging rate would result in the type of operation used commercially, namely, adiabatic, multi-reactor operation.

The HZSM-5 composite of Example 7 (47.5 g) was placed in the fourth reactor of an experimental adiabatic reforming unit having four reactors connected in sequence. The K factor of this system was 3.0. The standard platinum-rhenium-gamma alumina of Example 6 as described hereinabove, was placed in the first, second and third reactors (Case 1).

TABLE 10

| Reactor | Composite | Relative Activity | Case 1 Vol. (cc) | Case 2 Vol. (cc) |
|---|---|---|---|---|
| 1 | Pt/Re-Al2O3 Catalyst of Example 6 | 1.0 | 19.7 | 19.7 |
| 2 | Pt/Re-Al2O3 | 1.0 | 24.6 | 24.6 |
| 3 | Pt/Re-Al2O3 | 1.0 | 34.5 | 34.5 |
| 4 | HZSM-5/Pt/Re-Al2O3 | 6.4 | 47.5 | — |
| 4 | Pt/Re-Al2O3 | 1.0 | — | 47.5 |

A comparable run was made with all four reactors loaded with the commercial Pt/Reγ-Al2O3 of Example 6 (Case 2).

The start-up for both cases was identical. The catalyst was heated for two hours at 900° F. and 200 psig with a fresh hydrogen addition rate of 1–2 cubic feet per hour at a recycle rate of 10.24 cubic feet per hour. The temperature was dropped to 700° F., fresh hydrogen addition discontinued and 2.5 cu ft/hr of hydrogen containing 400 ppm of hydrogen sulfide was fed to the unit with a recycle rate of 8.3 cu ft/hour. When additional H2S was no longer consumed by the catalyst, H2S addition was stopped and fresh hydrogen added until a recycle flow rate of 10.24 cu ft/hr was established.

A liquid charge stock having the properties shown in Table 11 was pumped into the unit at 185 ml/hr. The temperature was increased to 800° F. During a 4 hour period chlorine (0.18 wt % of catalyst) as tertiary butyl chloride was pumped into the unit in the charge stock. During the remainder of the run chloride was continuously added at the rate of 0.046 g (as tertiary butyl chloride) per 100 g. of catalyst per day.

TABLE 11

| Charge Stock: C6-370° F. Paraffinic Naphtha | |
|---|---|
| Properties | |
| PONA, wt. % | |
| P | 59.0 |
| N | 28.1 |
| A | 12.9 |
| Specific Gravity | 0.7411 |
| ASTM, °F. | |
| 10% | 204 |
| 30% | 231 |
| 50% | 257 |
| 70% | 289 |
| 90% | 328 |

TABLE 11-continued

| Charge Stock: C₆-370° F. Paraffinic Naphtha | |
|---|---|
| E.P. | 365 |

The temperature was held at 800° F. until the water concentration in the overhead from the high pressure separator dropped below 130 ppm. The temperature was increased to 875° F. and held until the water concentration dropped below 110 ppm. The temperature was further increased to 900° F. and was held there for 2 hours. The temperature was then increased to 930° F. The pressure was 200 psig, the space velocity was 1.43 vol. of liquid per vol. of catalyst per hour and the total recycle ratio was 10.4 moles of recycle gas per mole of charge naphtha.

During the run in Case 2, where the inlet temperatures to all four reactors were kept equal, the temperatures were appropriately increased up to an end point of 990° F. in order to maintain a 100 clear research octane number for the $C_5^+$ liquid product. The calculated $C_5^+$ clear research octane number of the material leaving the 3rd and entering the 4th reactors was 98. A temperature increase at the rate of 2.9° F. per day was required to maintain this octane number.

In Case 1, the inlet temperatures to reactors 1, 2 and 3 were kept equal. The temperatures were appropriately increased to maintain a 95 clear research octane number for the $C_5^+$ product leaving the 3rd reactor and entering the 4th reactor. This required an increased of 0.4° F. per day. The inlet temperature of the 4th reactor at 930° F. maintained a 100 clear research octane number for the $C_5^+$ liquid product from the total unit.

The total cycle time for Case 1 far exceeds the cycle time for Case 2. Case 2 reached the end point temperature in 17 days which was 49° F. above its start-of-cycle temperature. Case 1 in 35 days showed a 15° F. increase for the first, second and third reactors. Reactor 4 remained constant. It is obvious that Case 1 will show far superior cycle life than Case 2. This longer cycle life is the result of the superior activity and stability of HZSM-5 composite in the 4th reactor of Case 1.

We claim:

1. In a process for reforming a hydrocarbon charge stock under reforming conditions by contacting said charge with a reforming catalyst, the improvement whereby the reforming catalyst is a reforming catalyst system in which the total catalyst combination comprises from about 1% to about 100% of a composite comprising
    (a) an effective amount, up to about 25% by wt. of a crystalline aluminosilicate zeolite,
    (b) not less than about 75%, by wt. of a carrier material,
    (c) from about 0.01% to about 2%, by wt., of a platinum group metal either alone or in combination with other metals, and
    (d) from about 0.01 to about 3%, by wt., of a halide and from 0% to about 99% of a conventional reforming catalyst composition comprising
    (a) a carrier material,
    (b) from about 0.01% to about 2%, by wt., of a platinum group metal either alone or in combination with other metals,
    (c) from about 0.01% to about 3%, by wt., of a halide said total catalyst system having a K factor from about 1.5 to about 15, this factor being as defined in the specification in equations 2 and 3.

2. The process of claim 1 in which the metal is platinum.

3. The process of claim 2 in which platinum is associated directly with the zeolite.

4. The process of claim 1 in which the metal associated with the composite is a combination of platinum and rhenium.

5. The process of claim 4 in which platinum and rhenium are associated directly with the zeolite.

6. The process according to claim 1 wherein the reforming catalyst comprises platinum on alumina.

7. The process of claim 1 wherein the reforming catalyst comprises platinum and rhenium on alumina.

8. A process according to claim 1 wherein the zeolite is ZSM-5 and has the X-ray diffraction pattern as set forth in Table I.

9. A process according to claim 1 wherein the zeolite has been exchanged with ammonium cations.

10. The process of claim 1 wherein said zeolite is present to the extent of up to about 15%.

11. The process of claim 1 wherein the K factor is from about 1.5 to about 10.

12. The process of claim 1 wherein the K factor is from about 2 to about 5.

13. The process of claim 1 wherein the zeolite is mordenite synthesized to contain quaternary ammonium ions.

14. The process of claim 13 wherein the quaternary ammonium ion is tetraethylammonium.

15. The process of claim 1 wherein the zeolite is calcium Y.

16. The process of claim 1 wherein the zeolite is ZSM-35.

17. The process of claim 1 wherein the activity is controlled by steaming of the zeolite.

18. The process of claim 1 wherein the zeolite has a particle size of not more than 10 microns.

19. The process of claim 1 in which the carrier is alumina.

* * * * *

UNITED STATES PATENT AND TRADEMARK OFFICE
CERTIFICATE OF CORRECTION

PATENT NO. : 4,191,638
DATED      : March 4, 1980
INVENTOR(S) : CHARLES J. PLANK ET AL.

It is certified that error appears in the above-identified patent and that said Letters Patent are hereby corrected as shown below:

The title should read --NOVEL REFORMING CATALYSTS--.

Column 2, line 46, "cyrstalline" should read --crystalline--.

Column 2, line 63, "catalysts" should read --catalyst--.

Column 6, line 49, after "identified" delete second ",".

Column 9, line 42, "reference" should read --preference--.

Column 13, line 22 of Table 5, in the first column across from "Cat. Vol. (cc)", "0.5 cc" should read --0.55 cc--.

Column 14, line 12, "85°C." should read --85°F.--.

Signed and Sealed this

Twenty-eighth Day of October 1980

[SEAL]

Attest:

SIDNEY A. DIAMOND

Attesting Officer

Commissioner of Patents and Trademarks